(12) United States Patent
Hayashi et al.

(10) Patent No.: US 10,073,236 B2
(45) Date of Patent: Sep. 11, 2018

(54) LENS DRIVING APPARATUS, CAMERA MODULE, AND CAMERA-EQUIPPED MOBILE TERMINAL

(71) Applicants: Ichiro Hayashi, Tokyo (JP); Yohei Enta, Tokyo (JP)

(72) Inventors: Ichiro Hayashi, Tokyo (JP); Yohei Enta, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/700,217

(22) Filed: Sep. 11, 2017

(65) Prior Publication Data

US 2018/0011283 A1    Jan. 11, 2018

Related U.S. Application Data

(63) Continuation of application No. 15/197,807, filed on Jun. 30, 2016, now Pat. No. 9,791,661, which is a
(Continued)

(30) Foreign Application Priority Data

Dec. 26, 2012 (JP) ................. 2012-282762

(51) Int. Cl.
| | | |
|---|---|---|
| *G02B 7/09* | (2006.01) | |
| *H04N 5/232* | (2006.01) | |
| *H04N 5/225* | (2006.01) | |
| *G02B 7/02* | (2006.01) | |
| *G02B 7/08* | (2006.01) | |
| *G02B 27/64* | (2006.01) | |
| *G03B 17/02* | (2006.01) | |
| *H04N 5/228* | (2006.01) | |
| *G02B 7/04* | (2006.01) | |

(52) U.S. Cl.
CPC ............... *G02B 7/09* (2013.01); *G02B 7/02* (2013.01); *G02B 7/025* (2013.01); *G02B 7/04* (2013.01);
(Continued)

(58) Field of Classification Search
CPC ... G02B 7/09; G02B 7/04; G02B 7/02; G02B 7/025; G02B 7/08; G02B 27/64;
(Continued)

(56) References Cited

U.S. PATENT DOCUMENTS

| | | |
|---|---|---|
| 9,405,088 B2 | 8/2016 | Hayashi |
| 2009/0232483 A1 | 9/2009 | Anshita |

(Continued)

FOREIGN PATENT DOCUMENTS

| | | |
|---|---|---|
| CN | 2672692 Y | 1/2005 |
| JP | 2008-90023 A | 4/2008 |

(Continued)

*Primary Examiner* — William R Alexander
(74) *Attorney, Agent, or Firm* — Brundidge & Stanger, P.C.

(57) ABSTRACT

A lens driving apparatus includes: a lens holder including an auto-focusing first coil; a lens holder moving section; driving magnets disposed at four corners of the lens holder moving section; a camera-shake correction second coil; a plurality of suspension wires; an elastic member; and at least one damper compound, wherein the elastic member comprises first and second leaf springs mounted to first and second ends of the lens holder moving section, respectively, the second leaf spring is arranged apart from the fixed member compared to the first leaf spring, the fixed member is disposed at a position in the vicinity of the first leaf spring, the plurality of suspension wires extend along the first direction, are fixed to the fixed member and the second leaf spring, and the damper compound is disposed at a position in the vicinity of the second leaf spring.

9 Claims, 8 Drawing Sheets

Related U.S. Application Data continuation of application No. 14/138,321, filed on Dec. 23, 2013, now Pat. No. 9,405,088.

(52) U.S. Cl.
CPC ............... G02B 7/08 (2013.01); G02B 27/64 (2013.01); G02B 27/646 (2013.01); G03B 17/02 (2013.01); H04N 5/225 (2013.01); H04N 5/228 (2013.01); H04N 5/2254 (2013.01); H04N 5/23287 (2013.01)

(58) Field of Classification Search
CPC ...... G02B 27/646; G03B 17/02; H04N 5/225; H04N 5/2254; H04N 5/228; H04N 5/23287
USPC .......................................................... 359/557
See application file for complete search history.

(56) References Cited

U.S. PATENT DOCUMENTS

| | | | | |
|---|---|---|---|---|
| 2011/0096178 A1* | 4/2011 | Ryu | ..................... | H04N 5/2252 348/208.2 |
| 2011/0141342 A1* | 6/2011 | Ming | ..................... | G02B 7/08 348/345 |
| 2012/0099201 A1 | 4/2012 | Chan et al. | | |
| 2012/0154614 A1 | 6/2012 | Moriya et al. | | |
| 2012/0300088 A1 | 11/2012 | Terajima | | |
| 2013/0050828 A1* | 2/2013 | Sato | ..................... | G02B 27/64 359/557 |
| 2013/0215284 A1* | 8/2013 | Wade | ..................... | G03B 5/00 348/208.7 |
| 2014/0177056 A1 | 6/2014 | Hayashi et al. | | |
| 2014/0232888 A1* | 8/2014 | Sekimoto | ..................... | G03B 5/00 348/208.11 |
| 2015/0226978 A1* | 8/2015 | Sugawara | ..................... | G02B 7/08 359/557 |
| 2016/0306134 A1 | 10/2016 | Hayashi | | |

FOREIGN PATENT DOCUMENTS

| | | |
|---|---|---|
| JP | 2010-197519 A | 9/2010 |
| JP | 2011-65140 A | 3/2011 |
| JP | 2011-085666 A | 4/2011 |
| JP | 2012-8379 A | 1/2012 |
| JP | 5007373 B | 6/2012 |
| JP | 2012-252120 A | 12/2012 |
| JP | 2013-190654 A | 9/2013 |
| WO | 2011/021559 A1 | 2/2011 |
| WO | 2011/142153 A1 | 11/2011 |

* cited by examiner

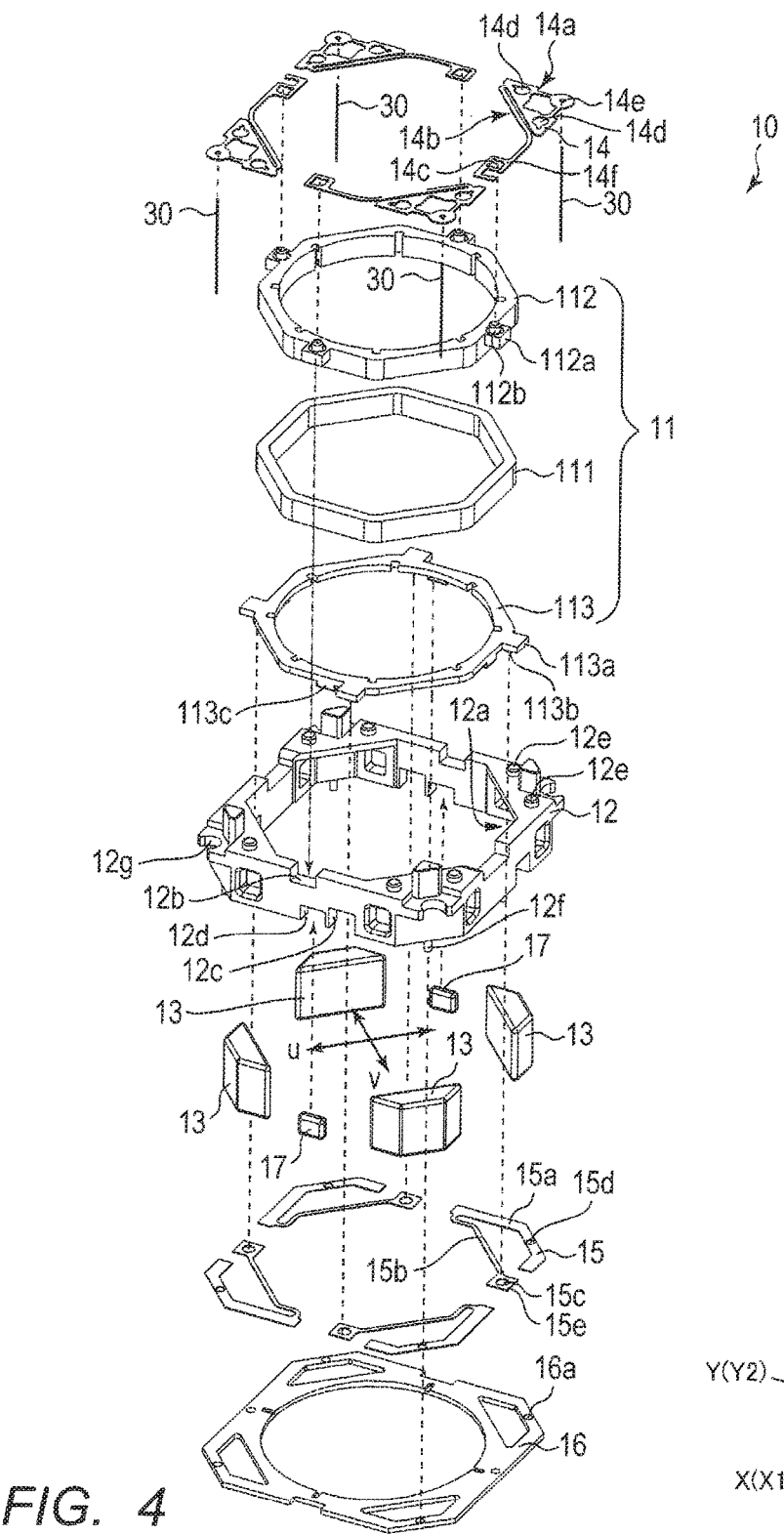
FIG. 4
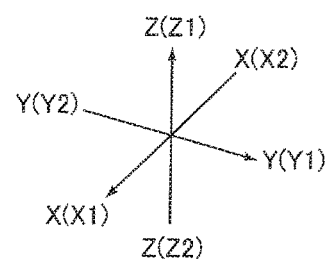

LENS DRIVING APPARATUS, CAMERA MODULE, AND CAMERA-EQUIPPED MOBILE TERMINAL

CROSS REFERENCE TO RELATED APPLICATIONS

The present application is a continuation of application Ser. No. 15/197,807, filed on Jun. 30, 2016, which is a continuation of application Ser. No. 14/138,321, filed on Dec. 23, 2013, now U.S. Pat. No. 9,405,088; which claims the benefit of priority from Japanese Patent Application No. 2012-282762, filed on Dec. 26, 2012, the disclosures of which are incorporated herein in their entirety by reference.

BACKGROUND OF THE INVENTION

Field of the Invention

The present invention relates to a lens driving apparatus for use in a camera equipped with an auto-focusing function and a camera-shake correction function, a camera module, and a camera-equipped mobile terminal.

Description of Related Art

Conventionally, as a camera installed in a mobile terminal such as a smartphone, a camera equipped with an auto-focusing function and a camera-shake correction function is known. Such a camera adopts a lens driving apparatus that automatically focuses on a subject to be captured by moving a lens barrel and can reduce an image defect by correcting a camera-shake (vibration) when capturing an image (for example, WO2011/021559).

A lens driving apparatus disclosed in WO2011/021559 includes a lens holder moving section that supports a lens holder in which a lens barrel is fixed, wherein the lens holder is supported in such a manner as to be movable in the optical axis direction. In this lens driving apparatus, an auto-focusing first coil is disposed around the lens barrel (lens holder), and a permanent magnet is disposed to the lens holder moving section, whereby an auto-focusing lens driving section (hereinafter referred to as AF lens driving section) is configured. The AF lens driving section moves the lens holder in the optical axis direction by utilizing an electromagnetic force (Lorentz force) which acts on a first coil when a current is passed through the first coil, to thereby perform auto-focusing.

In addition, in the lens driving apparatus disclosed in WO2011/021559, a second coil is disposed in a spaced relationship with an auto-focusing permanent magnet in the optical axis direction, whereby a camera-shake correction lens driving section is configured. The camera-shake correction lens driving section moves the lens holder moving section and the lens holder along a plane orthogonal to the optical axis direction by utilizing an electromagnetic force which is generated when a current is passed through the second coil, to thereby perform camera-shake correction.

The portion at which the second coil is disposed is referred to as a fixed section since the portion does not move at the time of the camera-shake correction, whereas the lens holder and the lens holder moving section are referred to as a movable section since they rock at the time of the camera-shake correction. The movable section is supported to the fixed section by a supporting member such as a suspension wire for example so as to be able to rock.

In the above-mentioned manner, the AF lens driving section and the camera-shake correction lens driving section share the permanent magnet, whereby the size and thickness of the lens driving apparatus can be reduced.

Generally, a lens holder moving section has an external form which is square in plan view as viewed in the optical axis direction, and includes a substantially circular (which encompasses regular polygons) holder housing section which is formed at a center portion and configured to house a lens holder. A permanent magnet for auto-focusing and camera-shake correction is composed of a cuboid bar magnet, and disposed along the four sides defining the external shape of the lens holder moving section. That is, the permanent magnet is disposed in parallel with the outer periphery of the product. In addition, the second coil making up the camera-shake correction lens driving section has an ellipsoidal form with rounded corners matching the form of the permanent magnet. The second coil is also disposed in parallel with the outer periphery of the product.

As used herein, the term "plan view" means a plan view in the optical axis direction.

In recent years, because of a trend toward multi-functionality of mobile terminals and the advent of thin devices such as smartphones, there has been a growing demand for further reduction in size and thickness. However, it is difficult to achieve further size reduction with the configuration of the conventional lens driving apparatuses.

More specifically, the conventional lens driving apparatus requires a sufficient space for disposing the permanent magnet in parallel with the outer periphery of the product around the holder housing section of the lens holder moving section. In addition, the external size of the fixed section at which the second coil is disposed is substantially the same as the lens holder moving section, which also hinders miniaturization.

SUMMARY OF THE INVENTION

An object of the present invention is to provide a lens driving apparatus, a camera module, and a camera-equipped mobile terminal which can achieve miniaturization in comparison with conventional technology.

A lens driving apparatus according to an embodiment of the present invention includes: a lens holder to which a lens barrel can be attached, the lens holder including an auto-focusing first coil; a lens holder moving section that is square as viewed in a plane orthogonal to a first direction along an optical axis, the lens holder moving section being configured to support the lens holder in such a manner that the lens holder is movable in the first direction; a driving magnet disposed at four corners of the lens holder moving section, the driving magnet being configured to move the lens holder in the first direction in cooperation with the first coil; a camera-shake correction second coil configured to move the lens holder in a second direction and a third direction in cooperation with the driving magnet, the second direction and the third direction corresponding to diagonal directions of the lens holder moving section; and a supporting section configured to support the lens holder moving section in such a manner that the lens holder moving section is movable in the second direction and the third direction.

A camera module according to an embodiment of the present invention includes: the above-mentioned lens driving apparatus; a lens barrel held by the lens holder; and an imaging section configured to capture a subject image formed by the lens barrel.

A camera-equipped mobile terminal according to an embodiment of the present invention includes the above-mentioned camera module.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein:

FIG. 4 is an exploded perspective view illustrating a movable section of the lens driving apparatus;

DESCRIPTION OF THE PREFERRED EMBODIMENTS

Now, an embodiment of the present invention will be described with reference to the accompanying drawings.

Figure 1:
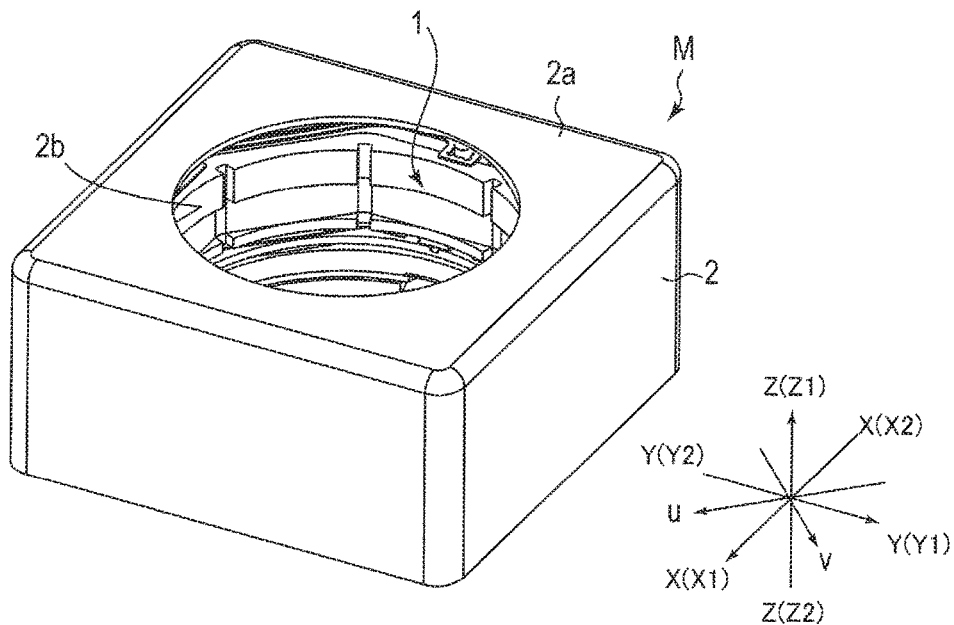
FIG. 1 is a perspective view illustrating an external appearance of a camera module according to an embodiment of the present invention.
Figure 2:
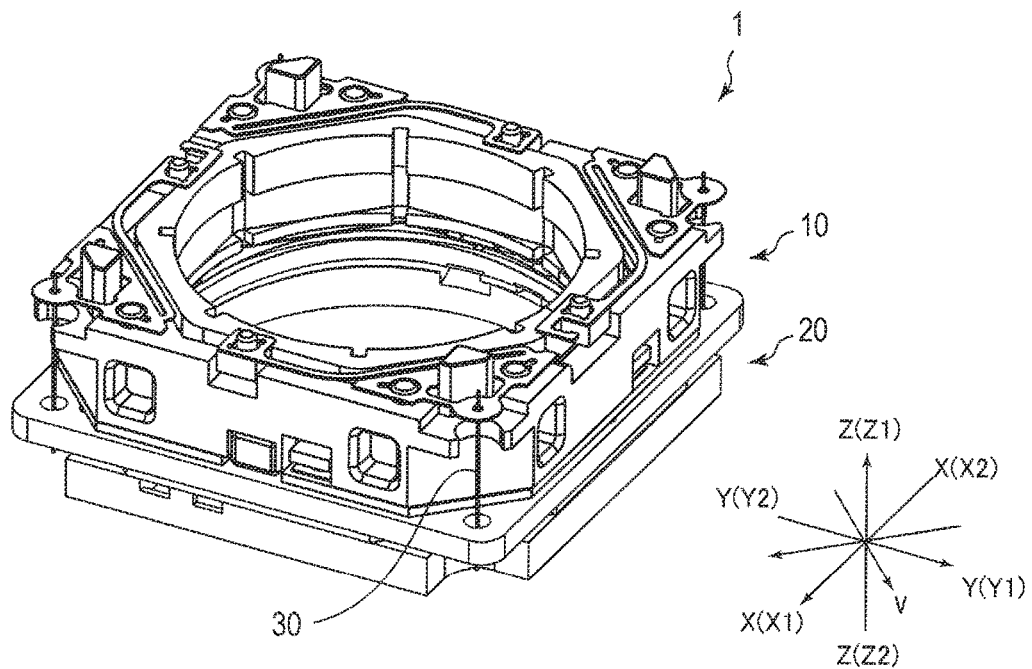
FIG. 2 is a perspective view illustrating an external appearance of a lens driving apparatus to be covered by a shield cover.
Figure 3:
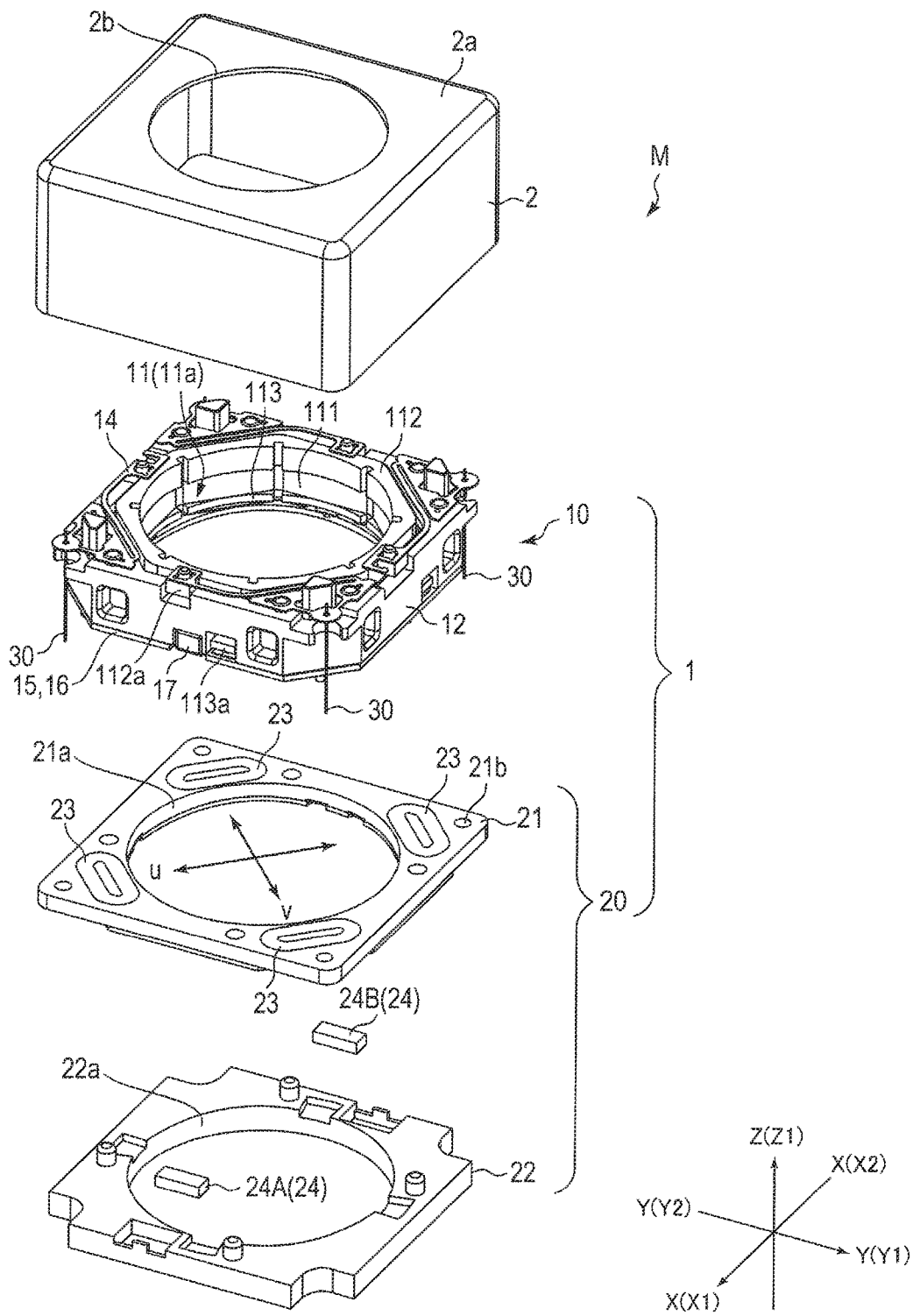
FIG. 3 is an exploded perspective view illustrating a camera module.

FIG. 1 is a perspective view illustrating an external appearance of camera module M according to an embodiment of the present invention. FIG. 2 is a perspective view illustrating an external appearance of lens driving apparatus 1 to be covered by shield cover 2. FIG. 3 is an exploded perspective view illustrating camera module M. FIG. 4 is an exploded perspective view illustrating movable section 10 of lens driving apparatus 1.

For the description, orthogonal coordinate system (X, Y, and Z) is used, as illustrated in FIG. 1 to FIG. 3. In FIG. 1 to FIG. 3, the X direction is the front-rear direction (depth direction), the Y direction is the horizontal direction (width direction), and the Z direction is the vertical direction (height direction).

In FIG. 1 to FIG. 3, the Z direction is the optical axis direction of a lens. In addition, the intermediate directions between the X and Y directions, or in other words, the diagonal directions in plan view in the Z direction of camera module M are u direction and v direction. The Z direction, u direction, and v direction correspond to a first direction, second direction, and third direction in the present invention, respectively.

Camera module M illustrated in FIG. 1 to FIG. 3 is a camera module to be mounted to a smartphone, for example. Camera module M is equipped with auto-focusing function and camera-shake correction function, and is capable of automatically focusing on a subject to be captured and of capturing images without image blurring by correcting camera-shake (vibration) when capturing images.

Camera module M includes a cylindrical lens barrel (not illustrated) that houses a lens, lens driving apparatus 1 that moves the lens barrel to perform auto-focusing and camera-shake correction, an imaging section (not illustrated) that captures an image of a subject, shield cover 2 that covers the entire camera module M, and the like.

Shield cover 2 is a box that covers the outer peripheral surface of lens driving apparatus 1. The upper surface 2a of shield cover 2 is square, and the lens barrel (not illustrated) faces the outside through circular opening 2b formed on upper surface 2a. That is, camera module M is square in plan view, and lens driving apparatus 1 covered by shield cover 2 also is square in plan view.

As illustrated in FIG. 2 and FIG. 3, lens driving apparatus 1 includes fixed section 20 which is fixed so as to be unmovable when camera module M is mounted to a mobile terminal or the like, and movable section 10 that rocks in the X-Y plane with respect to fixed section 20. Movable section 10 is disposed upwardly of fixed section 20 (in the Z1 direction) with a gap therebetween, and supported by a supporting member such as suspension wire 30 so as to be able to rock.

As illustrated in FIG. 3 and FIG. 4, movable section 10 includes lens holder 11, magnet holder 12, permanent magnet 13, upper spring 14, lower spring 15, spacer 16, position detecting magnet 17, and the like. Magnet holder 12, upper spring 14, lower spring 15, and spacer 16 make up a lens holder moving section that supports lens holder 11 so as to be movable in the Z direction.

Lens holder 11 includes first coil 111, upper coil holder 112, and lower coil holder 113.

First coil 111 is an air-core coil through which a current flows at the time of auto-focusing, in which a wire is wound in a substantially octagonal cylindrical form.

Upper coil holder 112 is an annular frame formed in an octagonal shape in plan view matching the external shape of first coil 111. Upper coil holder 112 includes protrusions 112a protruding radially outwardly. On the upper surface of protrusion 112a, boss 112b on which to attach upper spring 14 is formed.

Lower coil holder 113 is an annular frame formed in an octagonal shape in plan view matching the external shape of first coil 111. Lower coil holder 113 includes protrusions 113a protruding radially outwardly. On the bottom surface of protrusions 113a, boss 113b on which to attach lower spring 15 is formed.

Upper coil holder 112 and lower coil holder 113 tightly sandwich first coil 111. In other words, lens holder 11 is a vertically-separable lens holder, and cylindrical barrel housing section 11a is formed by the inner peripheral surfaces of first coil 111, upper coil holder 112, and lower coil holder 113. In lens holder 11, the inner peripheral surface of first coil 111 is exposed. The lens barrel (not illustrated) is fixed to barrel housing section 11a.

In the above-mentioned manner, in lens driving apparatus 1, lens holder 11 is made up of first coil (111) composed of an air-core coil, and a coil holding member (upper coil holder 112 and lower coil holder 113) that tightly sandwich first coil (111), and the inner peripheral surface of first coil (111) is exposed.

In comparison with a coil in which a wire is wound around the outer peripheral surface of a coil holder, the coil internal diameter is reduced by the thickness of the coil holder, which is effective in miniaturizing lens driving apparatus 1.

The lens barrel (not illustrated) is fixed to barrel housing section 11a of lens holder 11 by bonding. Although there is a possibility that a foreign matter such as dust enters lens driving apparatus 1 in the case where the lens barrel (not illustrated) is threadedly engaged with lens holder 11, such a defect can be prevented by the above-described fixing method.

Magnet holder 12 has a square cylindrical form which is square in plan view. Magnet holder 12 is provided, at its four corners, with magnet housing sections 12a at which permanent magnets 13 are disposed. Magnet housing sections 12a are each formed in an isosceles trapezoidal form in plan view matching the external shape of permanent magnet 13.

Recesses 12b are formed at substantially the center of the four sides on the upper surface of magnet holder 12. Protrusions 112a of upper coil holder 112 are disposed at respective recesses 12b.

In addition, two bosses 12e, on which to attach upper spring 14, are formed at each of the four corners on the upper surface of magnet holder 12. In addition, protruding portions 12g are formed at the four corners on the upper surface of magnet holder 12 so as to surround suspension wires 30.

Recesses 12c are formed at substantially the center of the four sides on the bottom surface of magnet holder 12. Protrusions 113a of lower coil holder 113 are disposed at respective recesses 12c. The depth of recess 12c is so set that it is sufficiently greater than the height of protrusion 113a of lower coil holder 113. The depth of recess 12c limits the migration length of lens holder 11 at the time of auto-focusing.

In addition, on the bottom surface of magnet holder 12, recess 12d adjacent to recess 12c is formed at the two sides facing each other in the X direction. Position detecting magnet 17 is disposed at recess 12d. In addition, one boss 12f on which to attach lower spring 15 and spacer 16 is formed at each of the four corners on the bottom surface of magnet holder 12.

Permanent magnet 13 is a magnet having an isosceles trapezoidal columnar form. Permanent magnet 13 is disposed at magnet housing section 12a located at the four corners of magnet holder 12 with the long side of the isosceles trapezoid being positioned on the radially inner side. Specifically, four permanent magnets 13 are disposed to face first coil 111 in the u direction and the v direction. Magnet holder 12 and permanent magnet 13 define a space having an octagonal shape in plan view, in which lens holder 11 can move in the Z direction.

Permanent magnet 13 is magnetized in such a manner that a magnetic field orthogonal to the radial direction is formed at first coil 111. Here, permanent magnet 13 is magnetized in such a manner that the inner periphery side thereof is N pole, and the outer periphery side thereof is S pole.

Upper spring 14 is a leaf spring made of beryllium copper, nickel copper, stainless-steel, or the like, for example and is composed of equally-shaped four members. Upper spring 14 includes magnet holder attaching section 14a to be fixed to the upper surface of magnet holder 12, and lens holder attaching section 14f to be fixed to the upper surface of lens holder 11 (upper coil holder 112). Upper spring 14 elastically supports lens holder 11 with respect to magnet holder 12.

Magnet holder attaching section 14a has a form corresponding to a corner on the upper surface of magnet holder 12. In magnet holder attaching section 14a, engagement hole 14d which engages with boss 12e formed on the upper surface of magnet holder 12 is formed. In addition, in magnet holder attaching section 14a, wire fixation hole 14e into which an end of suspension wire 30 is inserted is formed.

Between lens holder attaching section 14f and magnet holder attaching section 14a, arm section 14b extending along the external shape of lens holder 11 is formed. Engagement hole 14c which engages with boss 112b of upper coil holder 112 is formed in lens holder attaching section 14f.

Similarly to upper spring 14, lower spring 15 is a leaf spring made of beryllium copper, nickel copper, stainless-steel, or the like, for example, and is composed of equally-shaped four members. Lower spring 15 includes magnet holder attaching section 15a to be fixed to the bottom surface of magnet holder 12, and lens holder attaching section 15e to be fixed to the bottom surface of lens holder 11 (lower coil holder 113). Lower spring 15 elastically supports lens holder 11 with respect to magnet holder 12.

Magnet holder attaching section 15a has a form corresponding to a corner on the bottom surface of magnet holder 12. In magnet holder attaching section 15a, engagement hole 15d which engages with boss 12f formed on the bottom surface of magnet holder 12 is formed.

Between lens holder attaching section 15e and magnet holder attaching section 15a, arm section 15b extending along the external shape of lens holder 11 is formed. Engagement hole 15c which engages with boss 113b of lower coil holder 113 is formed in lens holder attaching section 15e.

At the time of fitting lens holder 11 to magnet holder 12, boss 12e of magnet holder 12 is inserted into engagement hole 14d of magnet holder attaching section 14a of upper spring 14, and fixed by thermal welding, for example. In addition, boss 112b of upper coil holder 112 is inserted into engagement hole 14c of lens holder attaching section 14f, and fixed by thermal welding or bonding.

Further, boss 12f of magnet holder 12 is inserted into engagement hole 15d of magnet holder attaching section 15a of lower spring 15, and engagement hole 16a of spacer 16 disposed below lower spring 15, and fixed by thermal welding, for example.

In addition, boss 113b of lower coil holder 113 is inserted into engagement hole 15c of lens holder attaching section 15e, and fixed by thermal welding or bonding.

Thus, lens holder 11 is elastically supported by upper spring 14 and lower spring 15 in such a manner that lens holder 11 can be displaced in the Z direction in the state where lens holder 11 is positioned with respect to magnet holder 12.

In addition, when four protrusions 113c formed on the bottom surface of lower coil holder 113 contact the upper surface of spacer 16, the entirety of lens holder 11 is lifted in the optical axis direction by the height of protrusion 113c, whereby upper spring 14 and lower spring 15 are caused to generate a back tension.

At this time, protrusions 112a of upper coil holder 112 are loosely fixed to recesses 12b formed on the upper surface of magnet holder 12, and protrusions 113a of lower coil holder 113 are loosely fixed to recesses 12c formed on the bottom surface of magnet holder 12. Further, lens holder attaching section 14f of upper spring 14 is distanced from the upper surface of magnet holder 12 by the height of protrusions 113c formed on the bottom surface of lower coil holder 113.

Specifically, by the distance between lens holder attaching section 14f of upper spring 14 and the upper surface of magnet holder 12, a back tension is generated at upper spring 14, and lens holder 11 (protrusions 112a) is pressed toward magnet holder 12. In addition, lens holder attaching section 15e of lower spring 15 is distanced by the same amount as upper spring 14, and accordingly a back tension is generated. With this configuration, in a non-energizing state, lens holder 11 does not move even when the posture of lens driving apparatus 1 is turned upside down. From this standard state, lens holder 11 moves upward (Z1 direction) at the time of auto-focusing (at the time of energization).

Figure 5:
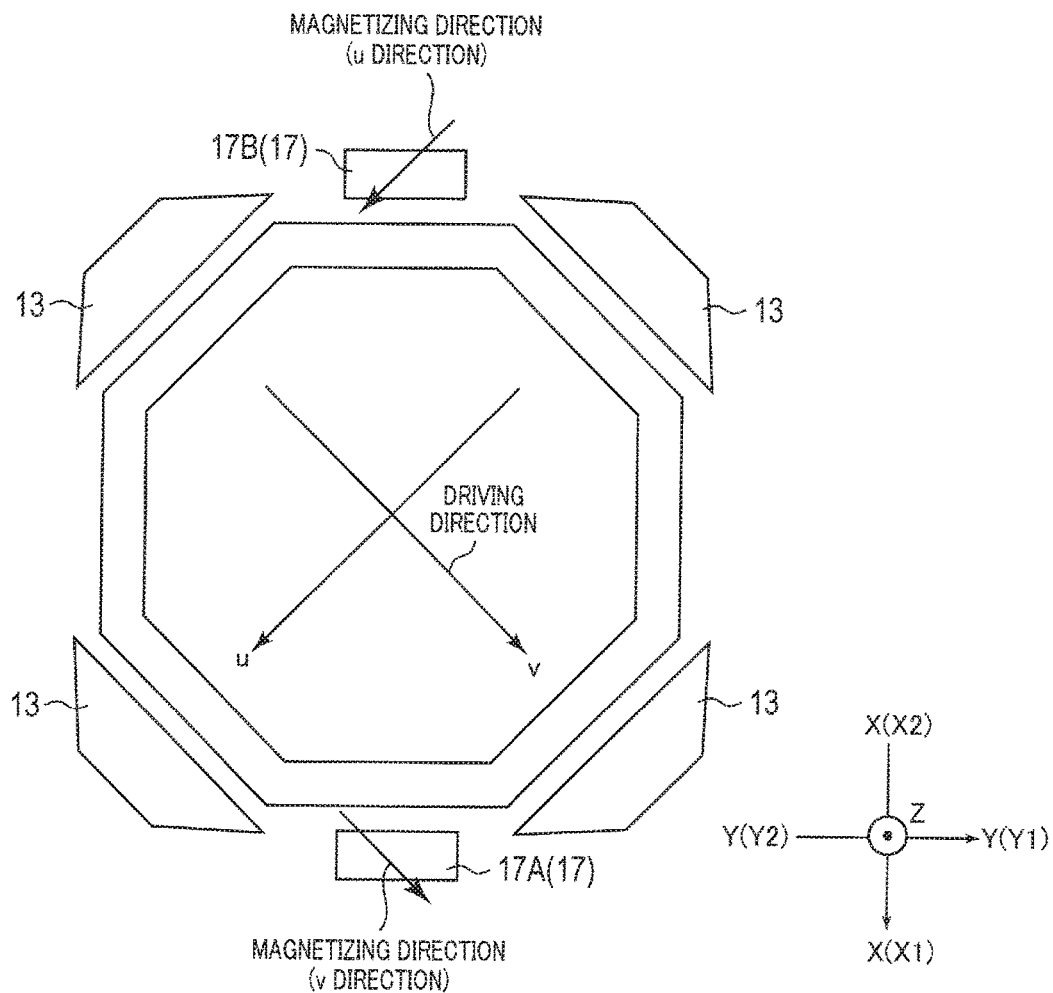
FIG. 5 illustrates magnetizing directions of position detecting magnets.

Position detecting magnets 17A and 17B are disposed in recesses 12d formed on the bottom surface of magnet holder 12 (see FIG. 5). Position detecting magnets 17A and 17B are cuboid bar magnets. Position detecting magnet 17A is obliquely magnetized in the v direction, and position detecting magnet 17B is obliquely magnetized in the v direction orthogonal to the u direction. The position of movable section 10 in the v direction can be detected by detecting the magnetic field formed by position detecting magnet 17A, and the position of movable section 10 in the u direction can be detected by detecting the magnetic field formed by position detecting magnet 17B. The magnetic fields formed by position detecting magnets 17A and 17B are detected by Hall devices 24A and 24B disposed to face position detecting magnets 17A and 17B in the Z direction.

In addition, also in the case where position detecting magnet 17A is obliquely magnetized in the u direction and position detecting magnet 17B is obliquely magnetized in the v direction, Hall devices 24A and 24B can detect the position of movable section 10 in the u direction and the v direction.

It is to be noted that, as position detecting magnets 17A and 17B, commonly used bar magnets magnetized in the longitudinal direction or the short direction may also be used. In this case, position detecting magnets 17A and 17B are obliquely disposed so that the magnetizing direction corresponds to the u direction or the v direction.

Fixed section 20 includes coil board 21, base member 22, and the like.

Similarly to magnet holder 12, coil board 21 is square in plan view, and circular opening 21a is formed at the center of coil board 21. In addition, at the four corners of coil board 21, wire fixation hole 21b into which the other end (lower end) of suspension wire 30 is inserted is formed.

At the four corners of coil board 21, camera-shake correction second coil 23 is disposed to face permanent magnet 13. Second coil 23 has a form of an isosceles trapezoid with rounded corners in plan view so as to correspond to the form of permanent magnet 13. The form, arrangement, and the like of permanent magnet 13 and second coil 23 are so set that the radial edges of permanent magnet section 13 fall within the cross-sectional width of the coil, or more specifically, are so set that the magnetic field radiated from permanent magnet 13 in the Z direction traverses the opposing two sides of second coil 23 and returns to permanent magnet 13. With this configuration, the driving force (electromagnetic force) for moving movable section 10 in the XY plane can be efficiently generated.

Similarly to coil board 21, base member 22 is square in plan view, and circular opening 22a is formed at the center of base member 22.

In addition, fixed section 20 includes a position detecting section that detects the position of movable section 10 in the XY plane, or more concretely, the position in the u direction and the v direction. In this example, as the position detecting section, Hall devices 24A and 24B are attached to base member 22. Hall devices 24A and 24B are disposed at respective positions facing detecting magnets 17A and 17B. Hall devices 24A and 24B are magnetic sensors that detect a magnetic field by utilizing Hall effect. When the magnetic field formed by position detecting magnets 17A and 17B is detected by Hall devices 24A and 24B, the position of movable section 10 in the XY plane can be detected.

In the above-mentioned manner, lens driving apparatus 1 includes the position detecting section that detects the position of the lens holder moving section (magnet holder 12, upper spring 14, lower spring 15, and spacer 16) in the second direction (the u direction) and third direction (the v direction).

To be more specific, lens driving apparatus 1 includes: a first position detecting magnet (position detecting magnet 17B) disposed along a side of the lens holder moving section (12, 14, 15, 16) and magnetized in the second direction (the u direction); and a second position detecting magnet (position detecting magnet 17A) disposed along a side of lens holder moving section (12, 14, 15, 16) different from the side along which first position detecting magnet is disposed and magnetized in the third direction (the v direction). The position detecting section is made up of first Hall device (24B) disposed to face first position detecting magnet (17B) in the first direction (the Z direction), and second Hall device (24A) disposed to face second position detecting magnet (17A) in the first direction (the Z direction).

Since components (such as coil, for example) having an influence on the magnetic field formed by position detecting magnets 17A and 17B are not disposed between position detecting magnets 17A and 17B and Hall devices 24A and 24B, the accuracy in the detection of magnetic field by Hall devices 24A and 24B is improved.

Movable section 10 and fixed section 20 are coupled by a supporting member such as suspension wire 30. To be more specific, four suspension wires 30 extend along the Z direction, and support the entirety of movable section 10 in such a manner that movable section 10 can rock in the XY plane. An end (upper end) of each of four suspension wires 30 is inserted into protruding portion 12g of magnet holder 12, and fixed to wire fixation hole 14e of upper spring 14 by soldering. The other end (lower end) of each of four suspension wires 30 is inserted into wire fixation hole 21b of coil board 21, and fixed by soldering.

It is to be noted that two of four suspension wires 30 are used also for supplying electricity to first coil 111. In addition, the number of suspension wires 30 is not limited to four, and it suffices that a plurality of suspension wires 30 are provided.

A damper (not illustrated) is disposed between magnet holder 12 and upper spring 14 so as to surround suspension wire 30. Specifically, magnet holder 12 includes protruding portions 12g protruding radially outwardly at the four corners of magnet holder 12. Protruding portions 12g are each provided at a position near wire fixation hole 14e in such a manner as to surround suspension wire 30 with a gap therebetween. The damper (not illustrated) is disposed between protruding portion 12g and upper spring 14 in such a manner as to surround suspension wire 30. The damper (not illustrated) can be readily applied by using a dispenser for example. For example, ultraviolet curable silicone gel (trade name: TB3168E, viscosity: 90 Pa·s) available from ThreeBond Co., Ltd. may be employed as the damper (not illustrated). It is to be noted that the damper (not illustrated) is not limited to the ultraviolet curable resin, and any materials may be used as long as a damper effect is obtained.

Since unnecessary resonance is suppressed by disposing the damper (not illustrated) between magnet holder 12 and upper spring 14 in such a manner as to surround suspension wire 30, the operation of lens driving apparatus 1 is remarkably stabilized. In addition, since the damper (not illustrated)

reduces the impact which is caused when the apparatus is dropped, the impact resistance of lens driving apparatus 1 is improved.

In addition, Hall devices 24A and 24B and a sensor board (not illustrated, FPC: Flexible printed circuits) on which a control section is mounted are disposed between coil board 21 and base member 22, as the imaging section. Further, an imaging device (not illustrated) is disposed below base member 22. The imaging device (not illustrated) is composed of a charge-coupled device (CCD) image sensor, a complementary metal oxide semiconductor (CMOS) image sensor, or the like, for example. The imaging device (not illustrated) captures a subject image formed by means of the lens barrel (not illustrated), converts this image into an electrical signal, and outputs this signal to the control section (not illustrated).

The control section (not illustrated) performs auto-focusing by controlling the current to be passed through first coil 111. In addition, the control section (not illustrated) performs camera-shake correction by controlling the current to be passed through second coil 24 on the basis of the position detection signal detected by two Hall devices 24A and 24B so as to offset the rock detected by two direction gyros (not illustrated).

Figure 6:
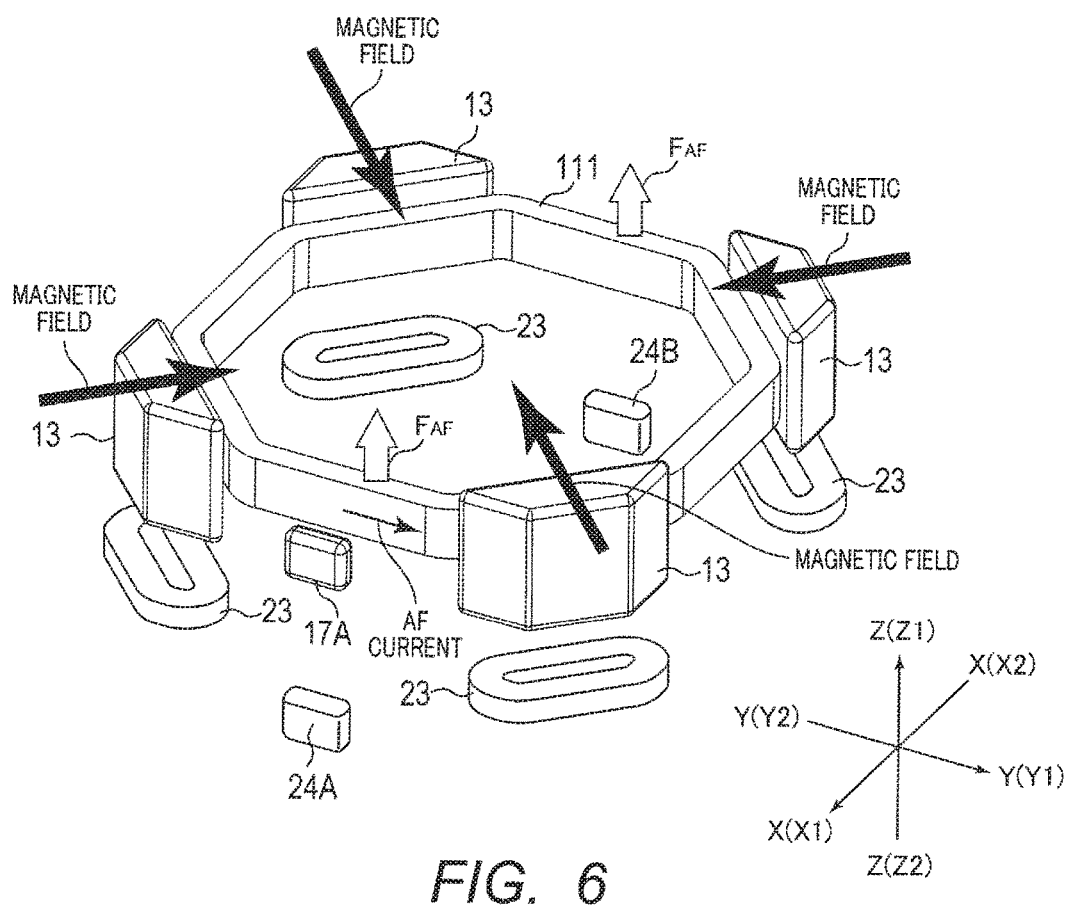
FIG. 6 illustrates the operating principle of auto-focusing in the lens driving apparatus.

FIG. 6 illustrates the operating principle of auto-focusing in lens driving apparatus 1.

When auto-focusing is performed in lens driving apparatus 1, permanent magnet 13 and first coil 111 cooperate with each other to move lens holder 11 in the Z direction. That is, the AF lens driving section includes permanent magnet 13 and first coil 111. To be more specific, in order to perform auto-focusing, the AF lens driving section moves lens holder 11 in the Z direction by utilizing an electromagnetic force (Lorentz force) which acts on first coil 111 when a current is passed through first coil 111.

As illustrated in FIG. 6, at first coil 111, a radially inward magnetic field is formed by permanent magnets 13. Accordingly, when a counterclockwise AF current is passed through first coil 111, upward electromagnetic force $F_{AF}$ (Lorentz force) is generated in first coil 111 according to Fleming's left hand rule. As a result, lens holder 11 (lens barrel) moves in the Z1 direction.

Since the magnitude of an electromagnetic force generated in first coil 111 changes when the value of the AF current changes, automatic focusing is achieved by controlling the value of AF current to adjust the migration amount of lens holder 11 (lens barrel).

It is to be noted that when lens holder 11 keeps on moving in the Z1 direction at the time of auto-focusing, protrusions 113a finally come into contact with recesses 12c of magnet holder 12, and thus further movement thereof is limited.

In other words, in lens driving apparatus 1, lens holder (11) includes a protrusion (protrusions 113a of lower coil holder 113) protruding radially outwardly, and the lens holder moving section (magnet holder 12) includes an engaging section (recesses 12c) which is to be engaged with the protrusion (113a) and restricts the movement of lens holder (11).

With this configuration, recesses 12c of magnet holder 12 function as a physical stopper at the time of auto-focusing, whereby damage and the like can be prevented when movable section 10 excessively moves due to malfunction.

Figure 7:
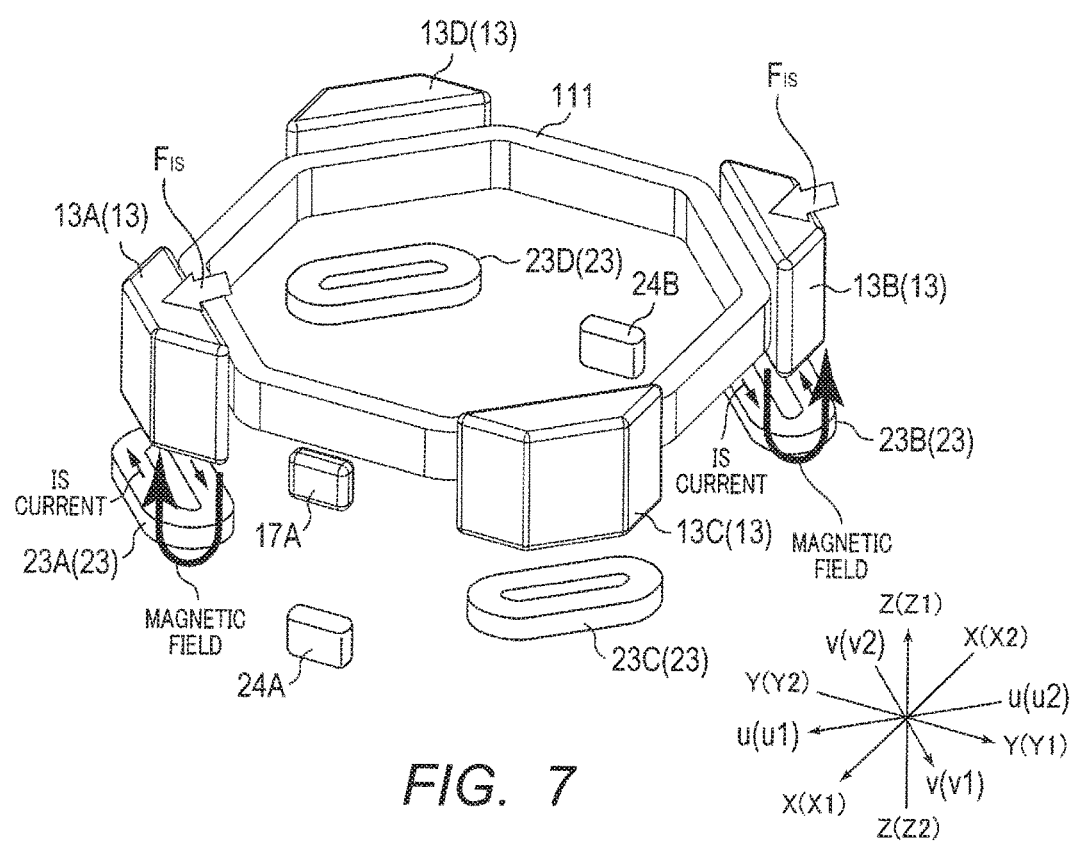
FIG. 7 illustrates the operating principle of camera-shake correction in the lens driving apparatus.

FIG. 7 illustrates the operating principle of camera-shake correction in lens driving apparatus 1.

When camera-shake correction is performed in lens driving apparatus 1, permanent magnet 13 and second coil 23 cooperate with each other to move lens holder 11 in the XY plane. That is, the camera-shake correction lens driving section includes permanent magnet 13 and second coil 23. To be more specific, in order to perform auto-focusing, the camera-shake correction lens driving section moves lens holder 11 in the XY plane by utilizing an electromagnetic force (Lorentz force) which acts on second coil 23 when a current is passed through second coil 23.

As illustrated in FIG. 7, at second coil 23A disposed in the u1 direction, a magnetic field that traverses second coil 23A in the Z direction is formed by permanent magnet 13A. Accordingly, when a clockwise IS current is passed through second coil 23A, a u2-directional electromagnetic force is generated in second coil 23A according to Fleming's left hand rule. Since second coil 23A is fixed, as a reaction thereto, u1-directional Force $F_{IS}$ acts on permanent magnet 13A.

In addition, at second coil 23B disposed in the u2 direction, a magnetic field that traverses second coil 23B in the Z direction is formed by permanent magnet 13B. Accordingly, when a counterclockwise IS current is passed through second coil 23B, a u2-directional electromagnetic force is generated in second coil 23B according to Fleming's left hand rule. Since second coil 23B is fixed, as a reaction thereto, u1-directional Force $F_{IS}$ acts on permanent magnet 13B.

As a result, lens holder 11 (lens barrel) moves in the u1 direction as movable section 10.

Conversely, when a counterclockwise IS current is passed through second coil 23A, and at the same time a clockwise IS current is passed through second coil 23B, lens holder 11 (lens barrel) moves in the u2 direction as movable section 10.

Likewise, when an IS current is passed through second coils 23C and 23D disposed in the v1 direction and v2 direction, lens holder 11 can be moved in the v1 direction or v2 direction.

In the above-mentioned manner, lens driving apparatus 1 includes: lens holder (11) that has auto-focusing first coil (111) disposed around the lens barrel (not illustrated) and holds the lens barrel; the lens holder moving section (magnet holder 12, upper spring 14, lower spring 15, and spacer 16) that is square as viewed in a plane orthogonal to the first direction (the Z direction) along the optical axis and supports lens holder (11) in such a manner that lens holder (11) is movable in the first direction (the Z direction); a driving magnet (permanent magnet 13) that is disposed at the four corners of lens holder moving section (12, 14, 15, 16) and moves lens holder (11) in the first direction (the Z direction) in cooperation with first coil (111); camera-shake correction second coil (23) that moves lens holder (11) in the diagonal direction of lens holder moving section (12, 14, 15, 16), that is, in the second direction (the u direction) and third direction (the v direction), in cooperation with driving magnet (13); and the supporting section (fixed section 20, suspension wire 30) that supports the lens holder moving section (12, 14, 15, 16) in such a manner that the lens holder moving section is movable in the second direction (the u direction) and third direction (the v direction).

According to lens driving apparatus 1, since the driving magnet (permanent magnet 13) and second coil (23) are disposed at the four corners of the apparatus which is square in plan view to effectively utilize the dead space in the conventional lens driving apparatuses, the space for disposing driving magnet (13) and second coil (23) can be reduced, and miniaturization can be achieved in comparison with conventional apparatuses.

Figure 8A:
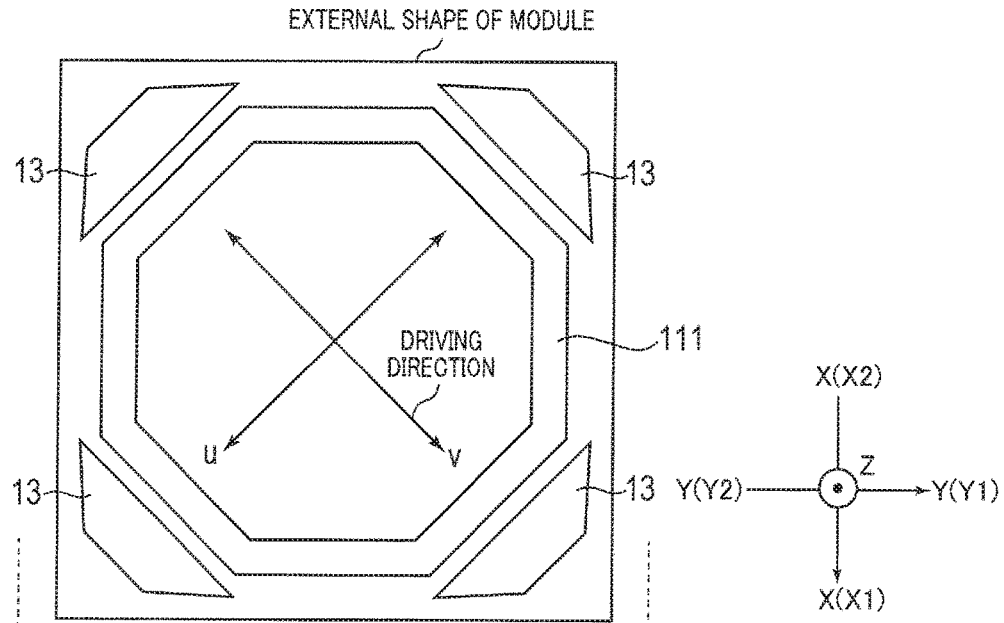
FIGS. 8A and 8B illustrate external shapes of the lens driving apparatus of the embodiment and a conventional lens driving apparatus, for comparison.
Figure 8B:
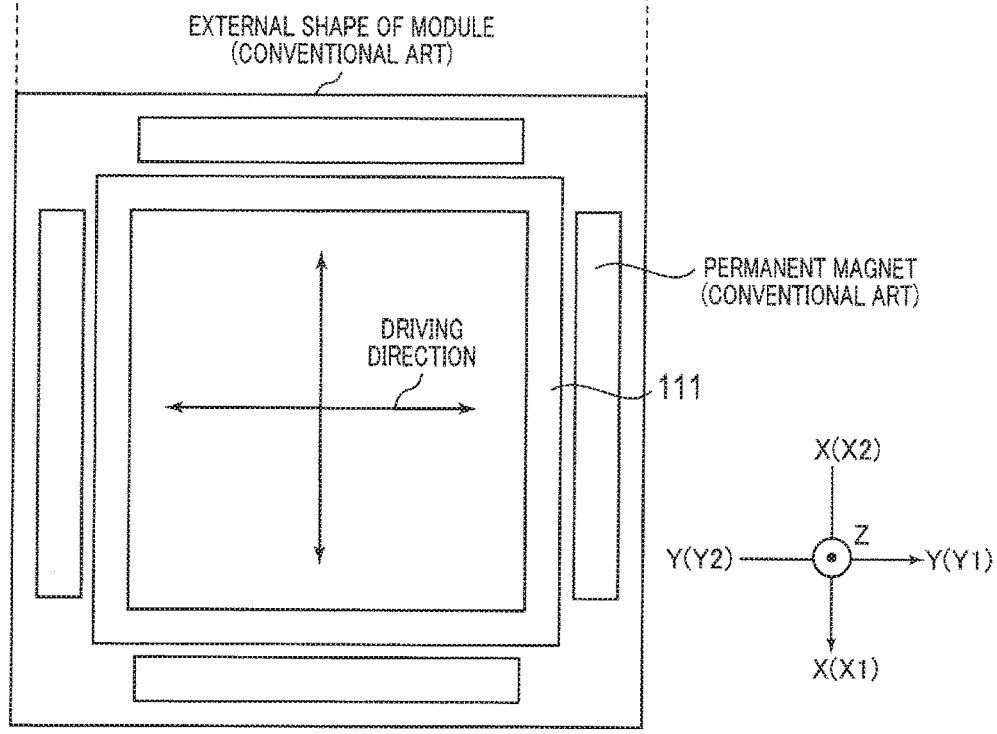

It is obvious that the external shape of camera module M according to the embodiment (see FIG. 8A) is smaller than that of the conventional camera module (see FIG. 8B) when substantially the same external shape of first coil 111 and substantially the same thickness of the permanent magnet are employed as illustrated in FIG. 8.

The present inventor estimates that the conventional lens driving apparatus having a size of 11.5 mm×11.5 mm can be miniaturized to the size of 8.5 mm×8.5 mm, by more than 45% in planar dimension.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, as position detecting magnets 17A and 17B, commonly used bar magnets which are magnetized in the longitudinal direction or the short direction may also be used. In this case, position detecting magnets 17A and 17B are obliquely disposed so that the magnetizing direction corresponds to the u direction or the v direction.

In addition, while position detecting magnets 17A and 17B are disposed at two sides of magnet holder 12 facing each other in the embodiment, position detecting magnets 17A and 17B may also be disposed at adjacent two sides. Also in this case, it suffices that one of position detecting magnets 17 is magnetized in the u direction and the other of position detecting magnets 17 is magnetized in the v direction.

In addition, it is also possible to dispose position detecting magnets 17A and 17B on fixed section 20 side, and Hall devices 24A and 24B on the movable section 10 side.

Figure 9:
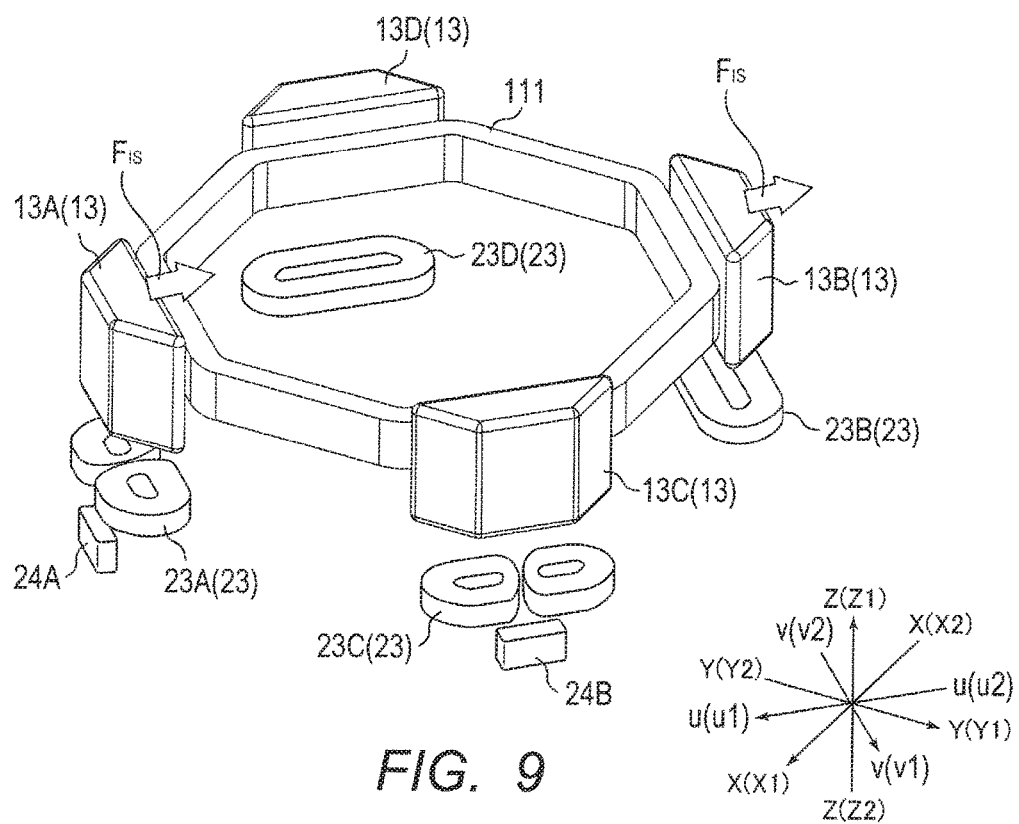
FIG. 9 illustrates a modification of a position detecting section.

In addition, it is also possible that, as illustrated in FIG. 9, Hall device 24A, which detects the position of movable section 10 in the u direction, is disposed to face one of permanent magnets 13A and 13B (in FIG. 9, permanent magnet 13A) in the Z direction with a gap therebetween, and Hall device 24B, which detects the position of movable section 10 in the v direction, is disposed to face one of permanent magnets 13C and 13D (in FIG. 9, permanent magnet 13C) in the Z direction with a gap therebetween. Here, permanent magnets 13A and 13B are disposed to face each other in the u direction, and permanent magnets 13C and 13D are disposed to face each other in the v direction.

In this case, since permanent magnets 13A and 13C are used for the position detection, it is not necessary to dispose position detecting magnets 17A and 17B unlike the embodiment. However, since second coils 23A and 23C are disposed between permanent magnets 13A and 13C and Hall devices 24A and 24B, a magnetic field which is generated when a current is passed through second coils 23A and 23C is undesirably detected by Hall devices 24A and 24B. In other words, under the influence of a magnetic field which is generated when a current is passed through second coils 23A and 23C, the detection accuracy of Hall devices 24A and 24B may be decreased.

In view of the above, when permanent magnets 13A and 13C are used for the position detection, it is preferable to employ separation-type coils, as second coils 23A and 23C, which are each separated at the center thereof in the longitudinal direction, as illustrated in FIG. 9. By disposing Hall devices 24A and 24B just below the portions where second coils 23A and 23C are separated, it is possible to prevent the problem that the detection accuracy of Hall devices 24A and 24B is decreased by a magnetic field which is generated when a current is passed through second coils 23A and 23C.

Further, as the position detecting section that detects the position of movable section 10 in the XY plane, an optical sensor composed of a combination of a photointerrupter and a reflection plate may be employed.

While camera module M and lens driving apparatus 1 to be mounted in a smartphone are described in the embodiment, the camera module and the lens driving apparatus according to the embodiment of the present invention are applicable to laptop computers, tablet personal computers, mobile terminals such as mobile game machines, Web cameras, and camera apparatuses such as in-vehicle cameras.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

What is claimed is:

1. A lens driving apparatus comprising:
a lens holder to which a lens barrel can be attached, the lens holder including an auto-focusing first coil;
a lens holder moving section that is rectangle as viewed in a plane orthogonal to a first direction along an optical axis, the lens holder moving section being configured to support the lens holder in such a manner that the lens holder is movable in the first direction;
driving magnets disposed at four corners of the lens holder moving section, the driving magnet being configured to move the lens holder in the first direction in cooperation with the first coil;
a camera-shake correction second coil configured to move a movable section in a second direction and a third direction in cooperation with the driving magnet, the movable section including the lens holder, the lens holder moving section, and the driving magnet, the second direction and the third direction corresponding to diagonal directions of the lens holder moving section;
a fixed member disposed apart from the movable section in the first direction, the fixed member including the second coil;
a plurality of suspension wires configured to support the movable section with respect to the fixed member in such manner that the movable member is movable in the second direction and the third direction;
an elastic member configured to support the lens holder in such manner that the lens holder is shiftable in the first direction, the elastic member being mounted to the lens holder moving section; and
at least one damper compound disposed so as to enclose at least one of the plurality of suspension wires, the damper compound being configured to suppress unnecessary resonance in the lens holder moving section, wherein:
the lens holder moving section has first and second ends opposite to each other in the first direction,
the elastic member comprises first and second leaf springs mounted to the first and the second ends of the lens holder moving section, respectively,
the second leaf spring is arranged apart from the fixed member compared to the first leaf spring,
the fixed member is disposed at a position in the vicinity of the first leaf spring, the plurality of suspension wires extend along the first direction, and have first end portions fixed to an outer portions of the fixed member and second end portions fixed to a wire fixation part of the second leaf spring, and the damper compound is disposed at a position in the vicinity of the second leaf spring.

2. The lens driving apparatus according to claim 1, wherein the lens holder moving section comprises an extending portion extending so as to enclose the at least one suspension wire at a position in the vicinity of the wire fixation part of the second leaf spring, and the damper compound is disposed in the extending portion so as to enclose the at least one suspension wire.

3. The lens driving apparatus according to claim 1, wherein the first coil is wound in a substantially octagonal cylindrical form.

4. The lens driving apparatus according to claim 1, wherein the lens holder is an annular frame formed in an octagonal shape as viewed in a plane orthogonal to the first direction so as to match an external shape of the first coil.

5. The lens driving apparatus according to claim 1, wherein the lens barrel is fixed to the lens holder by bonding.

6. The lens driving apparatus according to claim 1, wherein the lens holder is composed of: a first coil composed of an air-core coil; and a coil holding member configured to sandwich the first coil, and an inner peripheral surface of the first coil is exposed.

7. The lens driving apparatus according to claim 1, wherein the lens holder moving section comprises a magnet holder configured to hold the driving magnets, the lens holder comprises a protrusion protruding radially outwardly, and the magnet holder comprises an engaging section which is to be engaged with the protrusion and restricts movement of the lens holder.

8. A camera module comprising:

the lens driving apparatus according to claim 1;

a lens barrel held by the lens holder; and an imaging section configured to capture a subject image formed by the lens barrel.

9. A camera-equipped mobile terminal comprising the camera module according to claim 8.

* * * * *